United States Patent
Kadowaki et al.

[15] 3,691,143
[45] Sept. 12, 1972

[54] METHOD FOR RECOVERING A SOLVENT AND AN ELASTOMERIC POLYMER FROM AN ELASTOMERIC POLYMER SOLUTION

[72] Inventors: Takashi Kadowaki; Takao Iwasaki; Yutaka Mitsuta, all of Nishikubiki-gun; Kenji Shimada, Itoigawa, all of Japan

[73] Assignees: Denki Kagakv Kogyo Kabushiki Kaisha; Nippon Alpin Rubber Co., Ltd.

[22] Filed: July 14, 1970

[21] Appl. No.: 54,853

[30] Foreign Application Priority Data

July 22, 1969 Japan..................44/57406

[52] U.S. Cl...............260/85.5, 260/83.3, 260/83.7, 260/85.1, 260/85.3, 260/88.25, 260/88.7, 260/89.5, 260/91.1, 260/94.7, 260/92.8, 260/93.7, 260/94.9, 260/96

[51] Int. Cl..............................C08d 5/02, C08f 1/88

[58] Field of Search..260/94.7 R, 94.7 A, 85.1, 96 R, 260/94.9 F, 88.2 S

[56] References Cited

UNITED STATES PATENTS

| | | | |
|---|---|---|---|
| 3,287,301 | 11/1966 | Fysh et al. | 260/23.7 |
| 3,320,220 | 5/1967 | DiDrusco et al. | 260/80.5 |

*Primary Examiner*—Joseph L. Schofer
*Assistant Examiner*—William F. Hamrock
*Attorney*—Sughrue, Rothwell, Mion, Zinn and Macpeak

[57] ABSTRACT

A solvent and an elastomeric polymer are recovered and separated from a polymer solution obtained by a solution polymerization by treating the polymer solution with steam in the presence of a phosphate of polyoxyethylene alkyl ether or polyoxyethylene alkylaryl ether at pH value of more than 7 in an aqueous phase.

5 Claims, No Drawings

METHOD FOR RECOVERING A SOLVENT AND AN ELASTOMERIC POLYMER FROM AN ELASTOMERIC POLYMER SOLUTION

The present invention relates to a method for treating a polymer solution to recover a solvent and separate an elastomeric polymer or copolymer as an aqueous dispersion from the polymer solution.

Methods of polymerizing olefins by means of organometallic catalysts have been developed and in many cases dienes or $\alpha$-olefins are polymerized or copolymerized in the presence of a solvent to obtain a high molecular weight substance in a solution form. An after-treatment by which a solvent is recovered from such a polymer solution and the polymer is separated, is very difficult because of the high viscosity of an elastomer, when the polymer is an elastomer at room temperature. For the purpose, a large number of processes have been proposed. Among them, removal of solvent by means of steam is a most commercially advantageous means. This process will be explained in more detail. Namely, an elastomer solution and steam are introduced into water to volatilize and remove the solvent and to obtain the elastomer in a form of a dispersion of granular elastomer in water (slurry). This process has been proposed in many prior references as well as British Pat. No. 422,192 but the granular elastomer contains the solvent and therefore the viscosity is high and it is very difficult to keep the dispersed state only by a mechanically dispersing power. If the dispersing power is insufficient, the granular elastomer converts immediately into a lump and an apparatus for recovering the solvent is no longer operated. It is one means to further improve the mechanically dispersing power in order to solve such a problem but it has been proposed to utilize the dispersability of a surface active agent as a most convenient, commercial and safe means. For example, in Japanese Pat. application publication No. 6,716/62, there has been disclosed oxyethylated alkylphenol and in Japanese patent application publication No. 17,497/62, there has been disclosed a polymer having a plurality of carboxyl groups.

An object of the present invention is to provide a method of separating synthetic elastomeric polymers or copolymers as an aqueous dispersion by means of surface active agents showing more excellent dispersability than the conventional surface active agents.

A further object is to provide a method of using phosphates of polyoxyethylene alkyl ether or polyoxyethylene alkylaryl ether as the dispersing agent for the granular elastomer.

The other object is to use the surface active agent without deteriorating the physical and chemical properties of the elastomer.

These objects can be attained by the present invention, which is characterized in that a solution of an elastomeric polymer or copolymer in a solvent is treated with steam in an aqueous phase having pH of more than 7 in the presence of phosphates of polyoxyethylene alkyl ether or polyoxyethylene alkylaryl ether to remove the solvent.

The apparatus for removing the solvent to be used in the present invention should be provided with inlets for steam, the polymer solution and the surface active agent and outlets for steam and volatilized solvent and the aqueous dispersion of the elastomer. The apparatus for removing the solvent may be provided with a stirring means for maintaining a sufficient stirring, an inlet for water and a deforming agent, a heating or heat maintaining means for keeping the temperature in the apparatus at a defined condition and an air tight means for removing the solvent under a pressure. Such an apparatus has been described in Japanese Pat. application publication Nos. 12,941/62, 47,826/69 and 47,827/69. The pressure, temperature and stirring velocity to operate these apparatus and the like are determined depending upon the solvent and the extent to be removed.

The polymer solutions to be used in the present invention are produced by adding a polymerization catalyst to a mixture of a solvent for the polymerization and the monomer. As the solvents to be used herein, use may be made of inert hydrocarbons, for example, aliphatic saturated hydrocarbons, such as propane, butane, isobutane, n-pentane, isopentane, n-hexane, n-heptane, isooctane and the like; branched aliphatic hydrocarbons, such as 2,3-dimethylpentane, 2,2,4-trimethylpentane, 2,4- or 2,5-dimethylhexane; alicyclic saturated hydrocarbons, such as cyclohexane, methylcyclohexane and the like; aromatic hydrocarbons, such as benzene, toluene, xylene and the like; and chlorohydrocarbons, such as chloromethylene, chloromethane, chloroform, carbon tetrachloride and the like, alone or in admixture thereof.

As the monomers, use may be made of conjugated dienes, such as butadiene, isoprene, 2,3-dimethylbutadiene, 2-methoxybutadiene, 1,3-octadiene, 1,3-hexadiene and the like alone or in admixture of at least two monomers of the above described dienes; aryl-olefins, such as styrene, chlorostyrene and the like; $\alpha$-olefins, such as ethylene, propylene, butene-1, and the like; and polar olefins, such as methylmethacrylate, methyl vinyl ether, vinyl chloride, acrylonitrile and the like.

The elastomeric polymer solutions may be produced by reacting a mixture of these solvents and the monomers with a polymerization catalyst and there are a large number of polymerization catalysts and the method for removing the solvent according to the present invention is not limited by the polymerization catalysts. The first type polymerization catalyst is usually called an alfine catalyst, the components of which are NaCl, $NaOC_3H_7$ and $NaC_3H_5$. The second type polymerization catalyst is usually called an anion polymerization catalyst, the component of which is represented by the general formula $$R - Li$$

, wherein R represents hydrocarbon radicals, such as methyl, isopropyl, n-butyl and the like. The third type polymerization catalyst is usually called Ziegler-Natta catalyst, the component of which is obtained by reacting an organic compound of metals of Groups I, II and III of the Periodic Table and a hydride of the above described metals with a transition metal compound of Groups IV, V and VI of the Periodic Table.

The typical component is obtained by reacting triethylaluminum with titanium diiodide.

When the solvents, monomers and catalysts as described above are used and the polymerization conditions suitable for the catalysts are selected, a polymer solution containing 1 to 30 percent by weight of elastomer can be obtained and this is a raw material for recovering solvent. The thus obtained elastomeric polymer solution may be applied to an operation for deactivating the catalyst, removing the monomer, washing with water and the like. An elastomer solution which is not homogeneous and contains an elastomer precipitate, can be also used for the present invention.

In the present invention it is necessary to use phosphates of polyoxyethylene alkyl ether or polyoxyethylene alkylaryl ether represented by the general formula

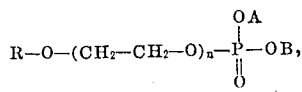

wherein R is an alkyl group having one to 20 carbon atoms or an alkylaryl group having one or more such an alkyl group, n is an integer of 2 to 100, and A and B represent hydrogen atom or $R-O-(CH_2-CH_2-O)_n-$ group as a surface active agent. When A and B are hydrogen, this phosphate is referred to as monoester of phosphoric acid, when any one of A and B is hydrogen, this phosphate is referred to as diester of phosphoric acid, and when both A and B are not hydrogen, this phosphate is referred to as triester of phosphoric acid. Among these three phosphoric acid esters, the triester has the highest dispersability, but the diesters and monoesters have also dispersability and are commercially useful. These phosphates, for example, are commercially available as "Plysurf" (Trademark, made by Daiichi Kogyo Seiyaku Co.). An aqueous dispersion of elastomer is unstable merely by directly adding this surface active agent to the aqueous dispersion and the granules in the dispersion readily agglomerate and the apparatus for recovering the solvent is clogged with the agglomerated granules.

It has been found that when these phosphates are used as a surface active agent, if the aqueous phase in the aqueous dispersion has pH value of more than 7 and is alkaline, the dispersability is surprisingly improved and these esters show an extremely higher dispersability than the conventional surface active agents. When the elastomeric polymer is obtained from the polymer solution obtained by using an alfine catalyst and an anionic catalyst, the aqueous solution of the used catalyst shows a high alkalinity, so that the pH value of the aqueous phase in the aqueous dispersion is necessarily more than 7. On the other hand, when the elastomeric polymer is obtained from the polymer solution obtained by using Ziegler-Natta catalyst, the aqueous solution of the used catalyst is acidic and further the phosphates are essentially highly acidic and consequently in order to raise pH value of the aqueous phase in the aqueous dispersion it is necessary to add a highly basic substance. As the highly basic substances, mention may be made of alkali metals, such as lithium, potassium, sodium and the like; alkaline earth metals, such as magnesium, calcium and the like; ammonium; hydroxides of alkali metals, alkaline earth metals or ammonium, carbonates; basic carbonates, oxalates, acetates, and higher fatty acid salts of alkali metals. The pH value of the aqueous dispersion can be adjusted by making the phosphates alkaline previously with such substances or by directly adding such substances to the aqueous dispersion. If pH value of the aqueous dispersion is more than 7 in this manner, the aqueous dispersion is kept stably by using 0.001 to 1 percent by weight, preferably, 0.005 to 0.05 percent by weight based on water of the phosphate. This amount is considerably smaller than that of conventional surface active agents and this has not been anticipated prior to adjusting pH value.

A ratio of elastomer granules to water in the aqueous dispersion containing the surface active agent, pH value of which has been adjusted, is determined depending upon the performance of the apparatus and is not limited. The granular elastomer in the aqueous dispersion obtained in this manner is crumbs-like granule having a diameter of about 1 cm and these granules are very stable under a sufficient stirring and do not agglomerate.

The aqueous dispersion of the elastomer obtained in the present invention can be discharged in a slurry state from the apparatus for removing solvent and can be easily separated into granular elastomer and water by allowing to stand. The separated granular elastomer is dried by means of roll drier, Bumbury's drier, expander drier or tunnel drier to obtain the elastomer containing substantially no volatile impurities.

The following examples are given in illustration of this invention and are not intended as limitation thereof.

EXAMPLE 1

This example shows an effect of adjustment of pH value.

A commercially available polybutadiene (Br-01 made by Nippon Gosei Gum Co.) was dissolved in benzene in a concentration of 6 percent by weight. To a 20 tank for removing solvent as charged 4l of water and the temperature was raised to 95°C. A surface active agent of polyoxyethylene alkyl ether phosphate (Trademark: "Plysurf A 208 B", made by Daiichi Kogyo Seiyaku Co.) was added thereto in an amount of 0.05 percent by weight based on water and pH value of the aqueous phase was adjusted to the given values as described in the following Table by means of NaOh. Then, the polybutadiene solution was introduced into the tank at a rate of 3.7 Kg/hr., while blowing steam under a pressure of 3.1 Kg/cm². The obtained result is shown in the following Table. In Experiment No 1 pH value was not adjusted.

TABLE

| Experiment No. | pH of aqueous phase | Elastomer form | Condition in tank |
|---|---|---|---|
| 1 | 4 | Granule is not formed | A large amount of rubber is sticked to the stirrer |
| 2 | 5 | " | " |
| 3 | 7 | String, a length of about 2 cm | A small amount of rubber is sticked to the stirrer |
| 4 | 9 | Uniform granule having a grain size of 1 cm | No rubber is sticked |
| 5 | 10 | " | " |

EXAMPLE 2

In this Example, an explanation will be made with respect to an aqueous dispersion of an alfine elastomer.

Ninety parts of butadiene and 10 parts of styrene were mixed with 900 parts of n-hexane and 1 part of 1,4-dihydronaphthalene and 30 parts of an alfine catalyst were added thereto. This alfine catalyst consists of NaCl, $NaC_3H_5$ and $NaOC_3H_7$. The resulting mixture was stirred for 3 hours, while maintaining the polymerization temperature at 30°C to obtain 10 percent by weight of elastomeric polymer solution. A part of the polymer solution was washed with water by a domestic mixer until the polymer solution became white. The removal of solvent was effected in the same manner as described in Example 1 and as the surface active agent, 0.03 percent by weight of phosphoric acid diester of polyoxyethylene nonylphenyl ether was used. The obtained result is shown in the following Table.

TABLE

| Experiment No. | Elastomer solution | pH of aqueous phase | Dispersion condition |
|---|---|---|---|
| 6 | Alfine polymer solution | 10 | Uniform granule of grain size of 1 cm, stickiness does not occur in the tank |
| 7 | A part of polymer solution washed with water | 4 | Granular elastomer is not obtained, a large amount of stickiness occurs |

In experiment No. 6, the catalyst component was dissolved off into the aqueous phase from the alfine polymer solution and pH in the aqueous phase increased.

EXAMPLE 3

Ten percent by weight of a solution of ethylene-propylene copolymer obtained by copolymerizing ethylene and propylene in a highly purified heptane by means of Ziegler catalyst is Sample A. Sample B is 7 percent by weight of a solution of polyisoprene obtained by polymerizing isoprene in a highly purified heptane by means of an organolithium catalyst. Sample C is 8 percent by weight of a solution of butadiene-styrene copolymer obtained by copolymerizing butadiene and styrene in a highly purified heptane by means of Ziegler catalyst. These polymer solutions were treated with the same manner as described in Example 1 to remove the solvent with steam. The obtained result is shown in the following Table.

TABLE

| Experiment No. | Sample No. | pH of aqueous phase | Adjustment of pH | Dispersion condition |
|---|---|---|---|---|
| 1 | A | 4.0 | Not adjusted | Polymer was dispersed but lumps having a diameter more than 5 cm were formed |
| 2 | A | 10.0 | Adjusted | Good dispersion |
| 3 | B | 4.0 | Not adjusted | Lump |
| 4 | B | 10.0 | Adjusted | Good dispersion |
| 5 | C | 3.9 | Not adjusted | Polymer sticks to the stirrer |
| 6 | C | 10.0 | Adjusted | Good dispersion |

EXAMPLE 4

In experiment No. 4 of Example 1, KOH was used instead of NaOH for pH adjustment and the same result as described in experiment No. 4 was obtained and the result was good.

EXAMPLE 5

In this Example, the properties of the resulting elastomer were compared. The elastomer granules obtained in experiment No. 4 of Example 1 were bound around a rubber processing roll (diameter; 30 cm), which was heated at 100°C for 20 minutes to remove water and the residual solvent. The resulting elastomer is Sample 1 and polybutadiene BR-01 is Sample 2. These samples were mixed in the following composition:

| | |
|---|---|
| Polybutadiene | 100 |
| Stearic acid | 3 |
| Zinc white | 5 |
| Diablack SH (Carbon black) | 50 |
| Sandex 790 (process oil) | 5 |
| Sulfur | 2 |
| Vulcanization accelerator CZ | 1.5 |

The resulting mixtures were vulcanized at 150°C for 20 minutes and the physical properties were determined to obtain the following result:

| | Sample 1 (used surface active agent) | Sample 2 (not used) |
|---|---|---|
| 300% modulus (Kg/cm²) | 162 | 158 |
| Tensile strength (Kg/cm²) | 181 | 187 |
| Elongation (%) | 325 | 314 |
| Bending crack (time) | 100 | 120 |
| Tear strength (Kg/cm²) | 22 | 24 |

The deterioration of the physical properties due to the surface active agent has never been observed.

What is claimed is:

1. A method for recovering elastomeric polymer or copolymer crumbs-like granules having a diameter of about one cm which comprises treating a polymer or copolymer solution obtained by a solution polymerization reaction with steam in the presence of a phosphate of polyoxyethylene alkyl ether or polyoxyethylene alkylaryl ether having the general formula

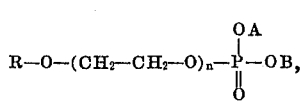

wherein R is an alkyl group having one to 20 carbon atoms or alkylaryl group having one or more such an alkyl group, n is an integer of 2 to 100 and A and B represent hydrogen atom or $R-O-(CH_2-CH_2-O)_n-$ group at a pH value of more than 7 in an aqueous phase to remove the solvent, said phosphate of polyoxyethylene alkyl ether or polyoxyethylene alkylaryl ether being added to the aqueous phase in an amount of 0.001 to 1% by weight based on water with essentially no foam being present.

2. A method as claimed in claim 1, wherein said elastomeric polymer is recovered from the polymer solution obtained by using an alfin catalyst.

3. A method as claimed in claim 1, wherein said elastomeric polymer is recovered from the polymer solution obtained by using an anion catalyst.

4. A method as claimed in claim 1, wherein said elastomeric polymer is recovered by adding a strong basic substance to the polymer solution obtained by using Ziegler-Natta catalysts to adjust pH value to more than 7.

5. A method as claimed in claim 1, wherein the amount of said phosphate is 0.005 to 0.05 percent by weight based on water.

* * * * *